Oct. 15, 1968    J. E. ZUPANICK    3,406,395
VEHICLE CHARACTERISTIC SENSING AND MEASURING APPARATUS
FOR VEHICULAR TRAFFIC CONTROL
Filed Aug. 25, 1966    6 Sheets-Sheet 1
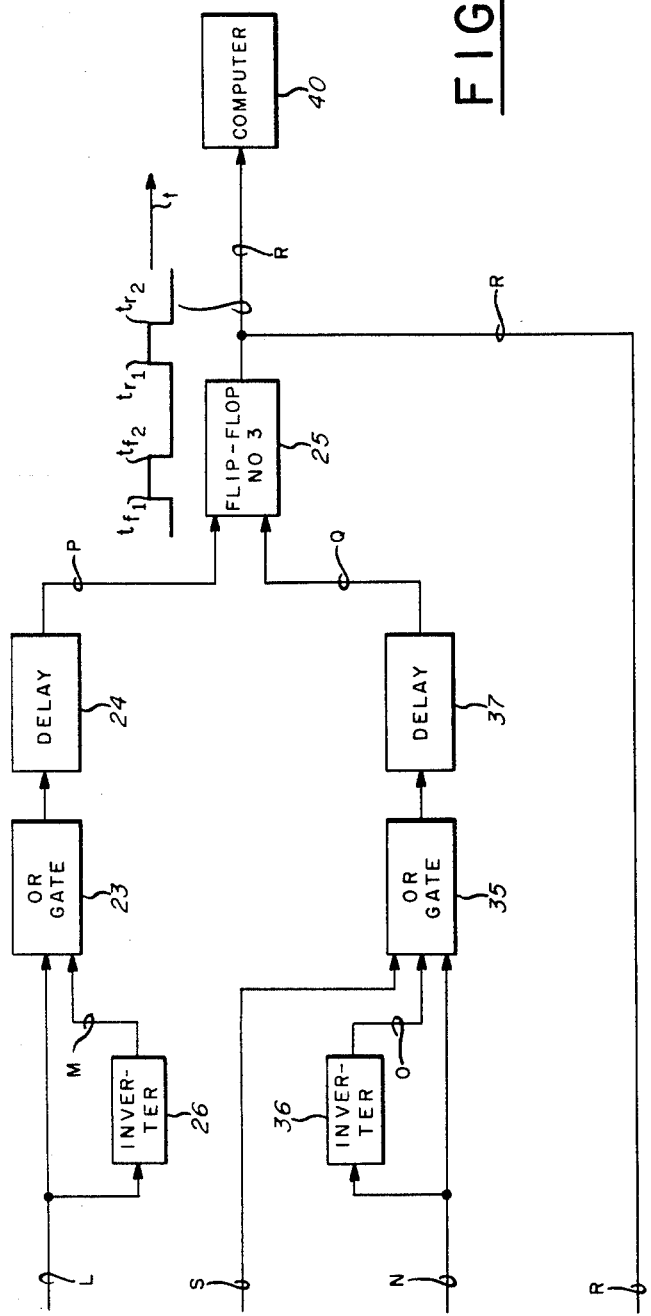
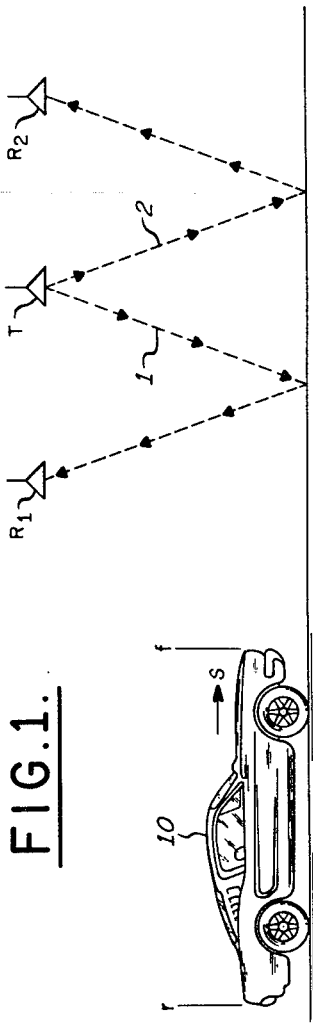
INVENTOR.
JOSEPH E. ZUPANICK
BY
H.P. Terry
ATTORNEY

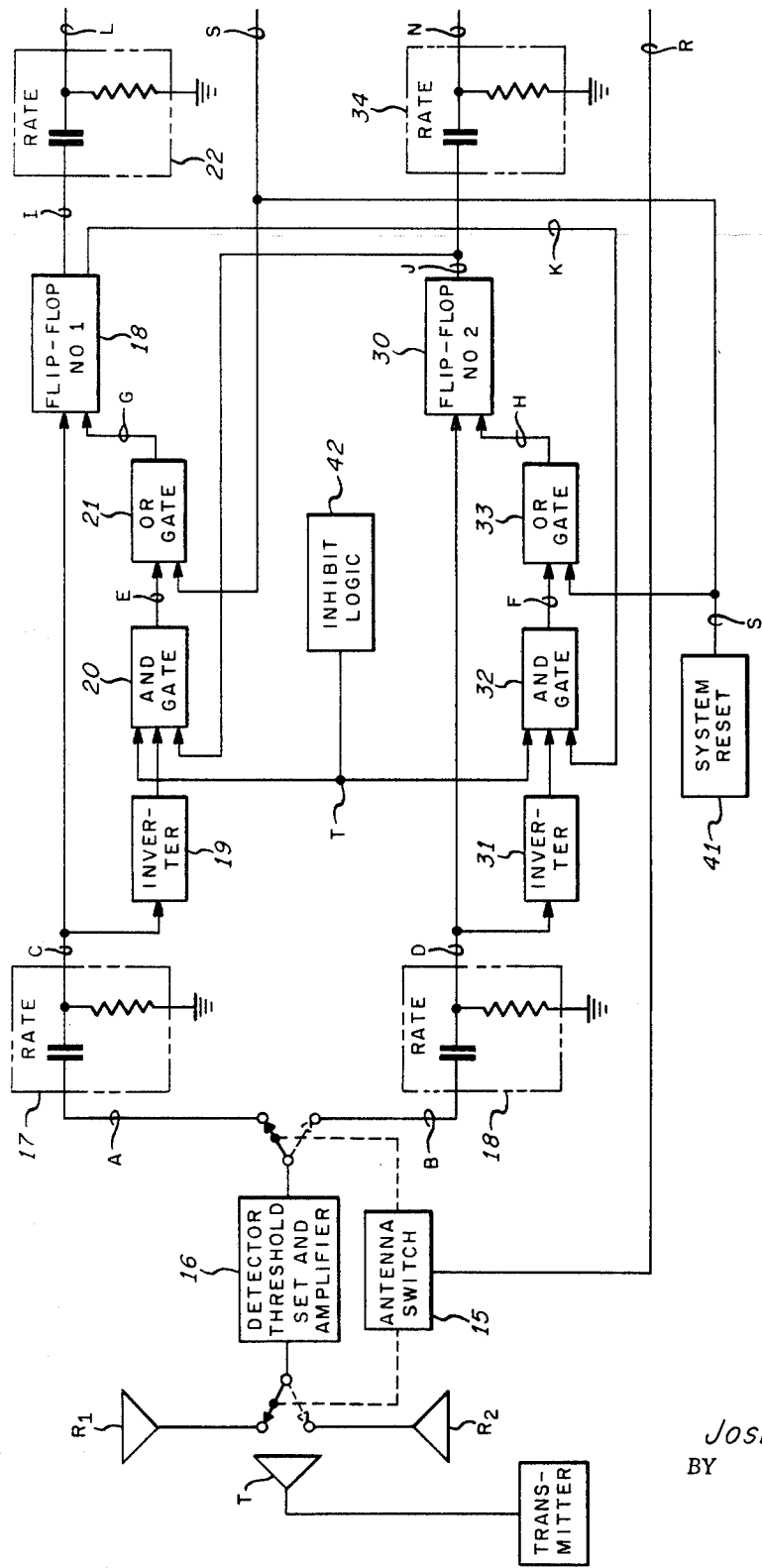

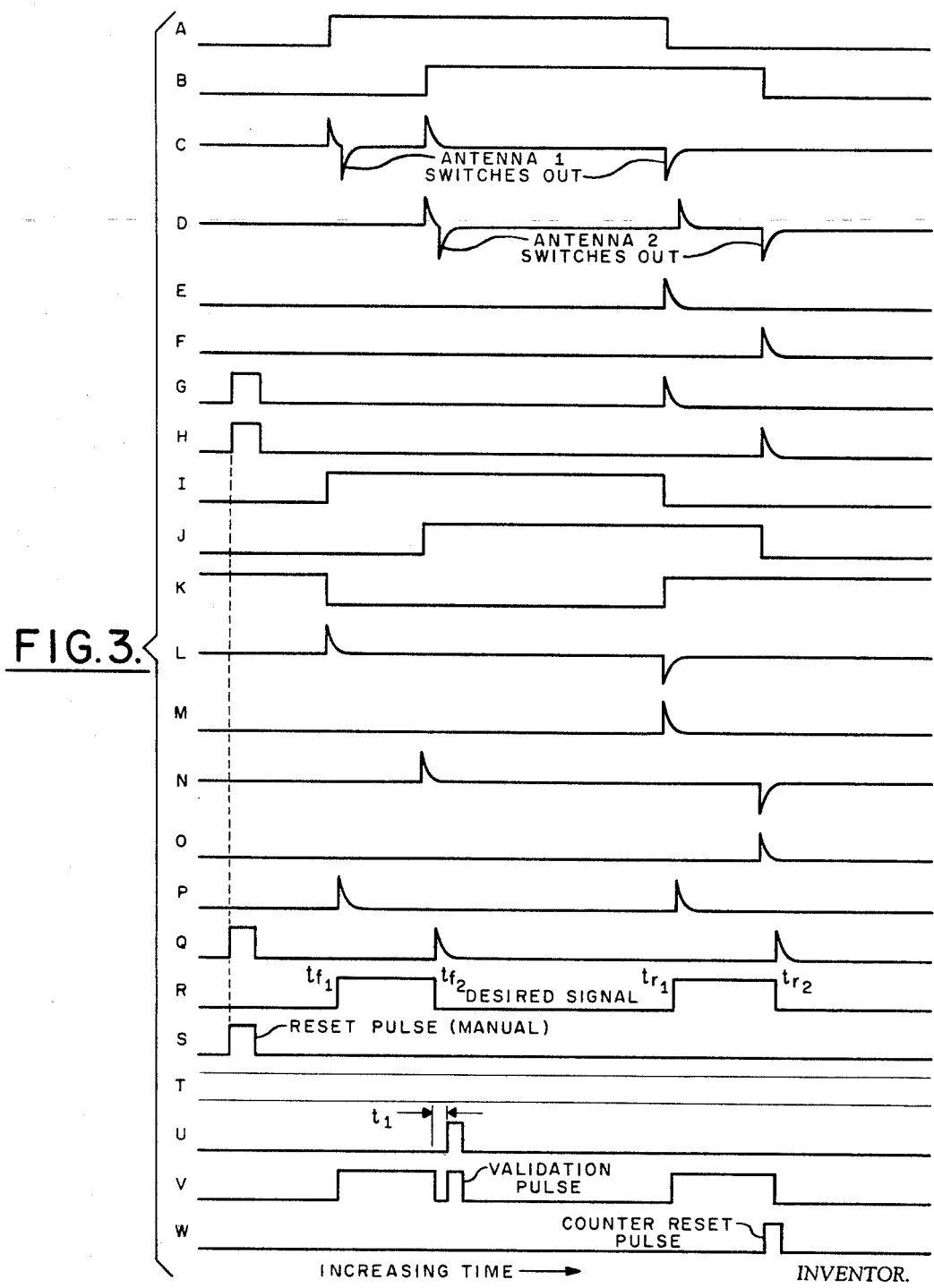

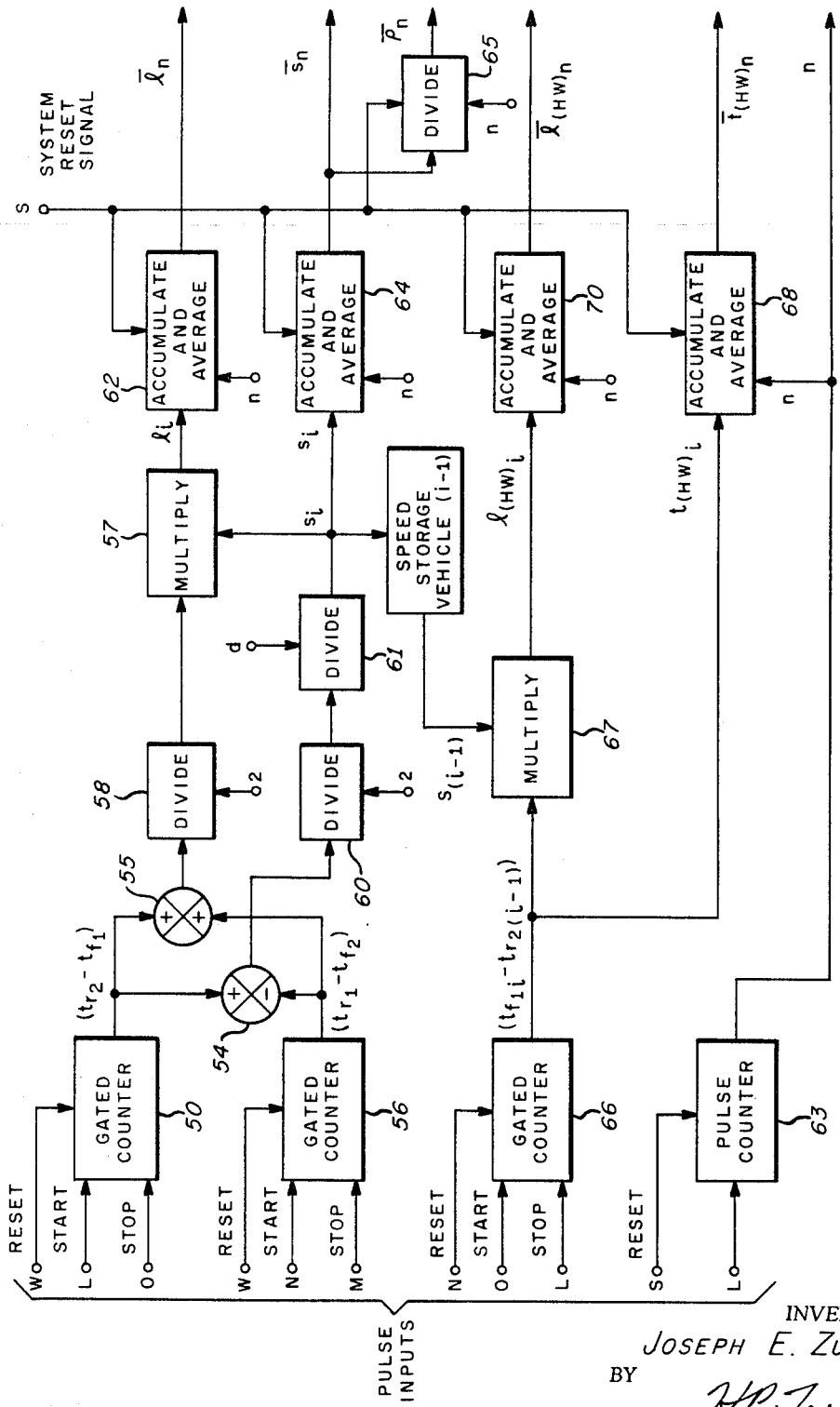

Oct. 15, 1968　　　　　J. E. ZUPANICK　　　　　3,406,395
VEHICLE CHARACTERISTIC SENSING AND MEASURING APPARATUS
FOR VEHICULAR TRAFFIC CONTROL
Filed Aug. 25, 1966　　　　　　　　　　　　6 Sheets-Sheet 6

INVENTOR.
JOSEPH E. ZUPANICK
BY
H P Terry
ATTORNEY

United States Patent Office 3,406,395
Patented Oct. 15, 1968

3,406,395
VEHICLE CHARACTERISTIC SENSING AND MEASURING APPARATUS FOR VEHICULAR TRAFFIC CONTROL
Joseph E. Zupanick, Westbury, N.Y., assignor to Sperry Rand Corporation, Great Neck, N.Y., a corporation of Delaware
Filed Aug. 25, 1966, Ser. No. 575,160
7 Claims. (Cl. 343—8)

---

ABSTRACT OF THE DISCLOSURE

Vehicular sensing and measuring apparatus for determining the individual as well as average speed and length of vehicles and the volume and density of traffic. This is accomplished by measuring the time that it takes for the front and rear of vehicles to pass predetermined points. Computer circuitry processes the discrete time intervals thus generated to provide outputs indicative of the various desired traffic parameters.

---

This invention relates to means for determining certain characteristics of moving objects for the purpose of controlling their movement. The present invention is particularly applicable to vehicular traffic control and traffic law enforcement.

The present invention concerns apparatus for determining the speed, length and count of a vehicle, such as an automobile, as well as the traffic volume and density. It can also provide information concerning the time and distance between a vehicle being measured and the one preceding it. It may be utilized in traffic control systems for controlling traffic flow throughout a city and it is particularly useful for providing the aforementioned signals to systems of the character described in U.S. patent application S.N. 452,974 entitled, "Traffic and Other Control Systems," of Giulianelli et al., filed May 4, 1965.

The efficacious control of traffic flow is dependent upon an accurate and current measurement of the speed, length and the number of vehicles being controlled. The traffic density as well as the time and distance between vehicles is also useful for scheduling and anticipating load conditions as well as safety. Thus, it is desirable to know the aforementioned physical characteristics of the vehicles being controlled, individually and in toto.

The present invention is an improvement over that described in U.S. patent application S.N. 450,662, now Patent No. 3,314,065 entitled, "Vehicle Sensing and Velocity Measuring Apparatus for Use in Traffic Control System," of Steigerwalt et al., filed Apr. 26, 1965.

It is a primary object of the present invention to provide apparatus for measuring characteristics of moving objects pertinent to controlling their movement.

It is another object of the present invention to provide apparatus for measuring characteristics of vehicles and vehicular traffic flow in order to provide efficient traffic movement and law enforcement.

It is a further object of the present invention to provide apparatus for measuring the speed and length of a vehicle, the density of vehicular traffic, and the time and distance between adjacent vehicles.

These and other objects are accomplished by measuring the time that the front and rear of vehicles pass predetermined points to provide discrete time intervals thereof. The intervals are then formulated to provide measures of vehicle speed, vehicle length, traffic volume, and traffic density as well as the time and distance between a vehicle being measured and the vehicle preceding the one being measured.

These and other objects will become apparent by referring to the specification and drawings in which:

FIG. 1 is a representation of a vehicle about to intersect sensing beams;

FIGS. 2a and 2b, taken together, are a schematic block diagram of apparatus for determining certain characteristics of vehicular movement in accordance with the present invention;

FIG. 3 is a graphical series of waveforms used in describing the operation of the system illustrated in FIG. 2.

FIG. 4 is a schematic block diagram of additions to the apparatus of FIG. 2;

Figure 5:
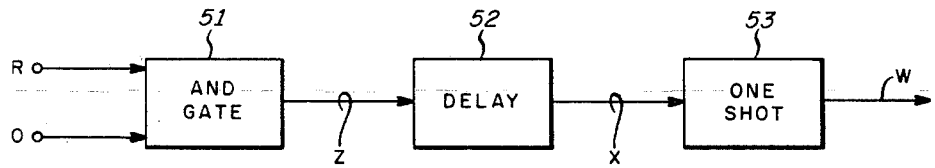
FIG. 5 is a schematic block diagram showing means for generating the counter reset pulse W.

Referring now to FIG. 1, an automobile 10 is shown moving with a speed $s$ along a particular traffic lane in order that it intersects beams 1 and 2 sequentially. The beams 1 and 2 are radiated from a transmitting antenna T which in conjunction with receiving antennas $R_1$ and $R_2$ may be of the type disclosed in said U.S. patent application S.N. 450,662. Beam 1 is reflected and then received by a receiving antenna $R_1$ while beam 2 is reflected and then received by a receiving antenna $R_2$. The transmitting antenna T is centered between the two receiving antennas $R_1$ and $R_2$ and all are aligned in the direction of travel of the traffic. The spacing between the two receiving antennas $R_1$ and $R_2$ is accurately known, e.g., two feet, and in practice may be mounted in a common receptacle with the transmitting antenna.

As explained more fully in said U.S. patent application S.N. 450,662, the transmitting antenna T continuously radiates pulses of electromagnetic waves in the directive patterns of beams 1 and 2 which cause the respective waves to impinge on the surface of the traffic lane on which the automobile 10 is traveling. As the automobile travels to the right as shown in FIG. 1, its front $f$ will intercept the upstream beam 1 first at time $t_{t_1}$. Since the automobile has a higher reflectivity than the roadway, an increased amount of energy will be reflected back to receiving antenna $R_1$. After the automobile has traveled the known distance $d$ in the unknown time interval $\Delta t$, its front $f$ will intercept the downstream beam 2 at time $t_{t_2}$ and will cause an increased amount of energy to be reflected back to receiving antenna $R_2$. The speed $s$ of the vehicle may be determined by obtaining a measurement of the time interval between the reflections of increased amplitude as received by the receiving antennas $R_1$ and $R_2$, since the distance $d$ is known in accordance with the formula:

$$s = \frac{d}{t_{t_1} - t_{t_2}}$$

In addition, a similar signal may be obtained from the passing of the rear $r$ of the vehicle through the beams 1 and 2. This provides an additional measure of the vehicle speed as indicated by Equation 1

$$s = \frac{d_{12}}{(t_{t_1} - t_{t_2})} = \frac{d_{12}}{(t_{r_1} - t_{r_2})} \quad (1)$$

where $t_{f_1}$ is the time when the front of the vehicle intercepts beam 1, $t_{f_2}$ is the time when the front of the vehicle intercepts beam 2, $t_{r_1}$ is the time the rear of the vehicle passes through beam 1, and $t_{r_2}$ is the time when the rear of the vehicle passes through beam 2. Speed information may be obtained from both the first pulse $(t_{f_1}-t_{f_2})$ as well as the second pulse $(t_{r_1}-t_{r_2})$. Further, the two pulses may be averaged to provide a more accurate measurement of speed if desired.

Vehicle length $l$ may also be determined as indicated in Equations 2 and 3

$$l = s(t_{f_1} - t_{r_1}) = s(t_{f_2} - t_{r_2}) \quad (2)$$

$$l = d_{12}\left(\frac{t_{f_1} - t_{r_1}}{t_{f_1} - t_{f_2}}\right) = d_{12}\left(\frac{t_{f_2} - t_{r_2}}{t_{r_1} - t_{r_2}}\right) \quad (3)$$

where $l$ equals vehicle length and $s$ equals speed obtained from Equation 1. Vehicle volume may be obtained by counting the pulses and dividing by two.

Referring now to FIGS. 2 and 3, one or the other of the receiving antennas $R_1$ and $R_2$ are selectively coupled by means of an antenna switch 15 to a detector, threshold set, and amplifier circuit 16. The circuit 16 detects the signals received from the coupled antenna and passes only detected pulses that exceed a set threshold level. This level is selected to permit only the higher amplitude pulses reflected from the vehicles to pass while inhibiting the lower amplitude pulses reflected from the surface of the road. The antenna switch 15 also selectively couples the circuit 16 to one or the other of RC differentiating or rate circuits 17 and 18, respectively. Initially, for purposes of explanation, it will be assumed that the antenna $R_1$ is coupled to the detector circuit 16 which in turn is coupled to the rate circuit 17. The rate circuit 17 is connected to the set input terminal of a bistable flip-flop 18 and also through an inverter circuit 19 to an AND gate 20. The output of the AND gate 20 is connected through an OR gate 21 to the reset input terminal of the flip-flop 18. The set output terminal of the flip-flop 18 is connected through another RC rate circuit 22. The output of the rate circuit 22 is connected directly as well as through an inverter circuit 26 to an OR gate 23 which has its output connected through a delay network 24 to a bistable flip-flop 25.

In a similar manner, the RC rate circuit 18 is connected to the set input terminal of a flip-flop 30 and also through an inverter circuit 31 to an AND gate 32. The AND gate 32 has its output terminal connected through an OR gate 33 to the reset input terminal of the flip-flop 30. The set output terminal of the flip-flop 30 is connected to an RC rate circuit 34 and also to an input terminal of the AND gate 20. The output of the rate circuit 34 is connected directly to an input terminal of an OR gate 35 and also through an inverter circuit 36 to another input terminal of the OR gate 35. The output of the OR gate 35 is connected through a delay network 37 to the flip-flop 25. The output of the flip-flop 25 is connected to a computing apparatus 40 and is also connected back to control the antenna switch 15.

The system is reset by means of a system reset 41 which may be of the character disclosed in said U.S. patent application S.N. 450,662 which provides a reset pulse to OR gates 21, 33 and 35. An inhibit signal T may also be provided from an inhibit logic circuit 42 to AND gates 20 and 32 for purposes to be described.

Referring now to FIGS. 2 and 3 for the operation of the present invention, initially, the system is reset by applying a reset pulse S as shown in FIG. 3 from the system reset 41 to the reset input terminals of the flip-flops 18, 25 and 30 through OR gates 21, 35 and 33, respectively. The antenna switch 15 couples the antenna $R_1$ to the detector 16 and the detector 16 to the rate circuit 17 by means of the output signal R from the flip-flop 25, thereby permitting detection of the signal from the antenna $R_1$. When the front of a car intercepts beam 1 and exceeds the threshold set by the circuit 16, a signal A is provided which when passed through the rate circuit 17 provides a rate signal C on the set terminal of the flip-flop 18. The set output signal I from the flip-flop 18 is applied to the rate circuit 22 where it is differentiated to provide a rate signal L through the OR gate 23 and thence delayed in the delay circuit 24 which results in a delayed rate signal P. The signal P sets the flip-flop 25 such that its output signal R is fed back to actuate the antenna switch 15 to now couple the antenna $R_2$ through the detector 16 to the rate circuit 18 thereby disconnecting the antenna $R_1$.

As the car continues along the predetermined path defined by the traffic lane, its front $f$ traverses the beam 2, and, in a manner similar to that described above, the flip-flop 30 is set by the rate signal D from the rate circuit 18 thereby providing at the output of the flip-flop 30 a signal J which is differentiated in the rate circuit 34 and applied as a rate signal N through the OR gate 35 and thence through delay 37 as signal Q to the reset input terminal of the flip-flop 25. The output signal R from the flip-flop 25 is again fed back to the antenna switch 18 to switch out antenna $R_2$ and switch in antenna $R_1$. This portion of the signal R is the desired $\Delta t$ signal with its leading edge being representative of $t_{f_1}$ and its trailing edge being representative of $t_{f_2}$.

When the rear $r$ of the car has traversed beam 1, the reflected signal sensed by the antenna $R_1$ is now below the threshold established by the circuit 16 and the signal A drops to zero. This signal change is applied through the rate circuit 17, the inverter 19 and the AND gate 20 which allows the inverted signal C to pass because the signal J is in a binary ONE state thereby providing a signal E through the OR gate 21 which resets the flip-flop 18. The signal I now drops and it is applied through the rate circuit 22, the inverter 26, the OR gate 23 and delayed by delay 24 before placing the flip-flop 25 in its set condition. The output signal R from the flip-flop 25 again causes the antenna switch 15 to switch to the antenna $R_2$ position and since the flip-flop 30 is already in a set condition, the signal D from antenna $R_2$ has no effect.

As the car continues to traverse the path and its rear end passes beam 2, the signal from antenna $R_2$ now drops and it is applied through the rate circuit 18, the inverter network 31 and the AND gate 32 since signal K provides the other required input thereby providing a signal F to the OR gate 33. The output signal H from the OR gate 33 resets the flip-flop 30 thereby causing the output signal J from the flip-flop 30 to drop resulting in a signal N which is inverted and passed through the OR gate 35 after which it is delayed in the delay circuit 37 and then resets the flip-flop 25. This places the system in its initial condition with the antenna $R_1$ coupled to the detector circuit 16 and the antenna $R_2$ switched off. This provides the other portion of the desired signal R which has its leading edge defined by $t_{r_1}$ and its trailing edge defined by $t_{r_2}$.

The time sequenced pulses provided by the apparatus of FIG. 2 as shown in the waveform diagram of FIG. 3 can be utilized to obtain the following information about an individual vehicle or a group of $n$ vehicles: (1) vehicle length, (2) vehicle speed, (3) point density, (4) time headway, (5) distance headway, and (6) vehicle count.

A means for obtaining the above data is shown in FIG. 4 where the pulses shown in FIG. 3 as obtained from appropriate portions of the apparatus of FIG. 2 are inputs to three gated counters and a pulse counter. Alternatively, the pulse inputs shown in FIG. 4 could be transmitted directly from the appropriate signal sources of the sensing apparatus of FIG. 2 and transmitted to a high speed digital computer 40 of the type disclosed in said U.S. patent application S.N. 452,974 to provide the data indicated above. In fact, many sensors in a system could transmit respective pulse inputs to a central computer where they could be time shared on a common high speed digital computer.

Referring to FIGS. 3 and 4, a gated counter 50 is responsive to pulses W, L and O as shown in FIG. 3 for reset, start and stop functions respectively. The pulse W is generated as shown in FIG. 5. The pulses R and O are connected to an AND circuit 51 thus requiring coincidence of the two pulses R and O for the output pulse Z to be valid. This provides rejection of unwanted pulses. The output pulse Z is then delayed in a delay circuit 52 for a time interval, e.g., 10 milliseconds, to allow the computations to be completed. The delayed pulse X is coupled to actuate a monostable multivibrator circuit 53 to provide a reset pulse W after each vehicle.

Referring again to FIGS. 3 and 4, the gated counter 50 provides a signal representative of $(t_{r_2}-t_{t_1})$ which is coupled to algebraic summation devices 54 and 55. A gated counter 56 is responsive to pulses W, N and M for reset, start and stop functions respectively to provide a signal representative of $(t_{r_1}-t_{t_2})$ which is coupled to the algebraic summation devices 54 and 55. The algebraic summation device 54 provides a signal representative of the difference between its two input signals while the device 55 provides a signal representative of the sum of its two input signals. The output of the device 55 is coupled through a divide-by-two circuit 58 to a multiplier circuit 57. The divide-by-two circuit 58 accounts for the fact that vehicle length is measured twice for each vehicle. The output of the device 54 is coupled through a divide-by-two circuit 60 to a dividing circuit 61 responsive to the distance signal $d$ which provides a signal $s$ representative of the vehicle speed in accordance with an implementation of the Equation 1 explained above. The divide-by-two circuit 60 is required since two speed measurements are made on each vehicle. The signal from the divider 58 is multiplied by the signal $s$ in the multiplier circuit 57 which provides a signal $l$ representative of the vehicle length. To provide a signal $\bar{l}_n$ representative of the vehicle length averaged over the number of vehicles $n$, the signal $l$ from the multiplier 57 is connected to an accumulate and average circuit 62 which is also responsive to the signal $n$ from pulse counter 63. The pulse counter 63 is responsive to a reset pulse S and a positive going pulse L to provide the signal $n$ representative of a numerical count of each vehicle as it passes the sensor per unit of time, e.g., vehicles per hour.

Figure 6:
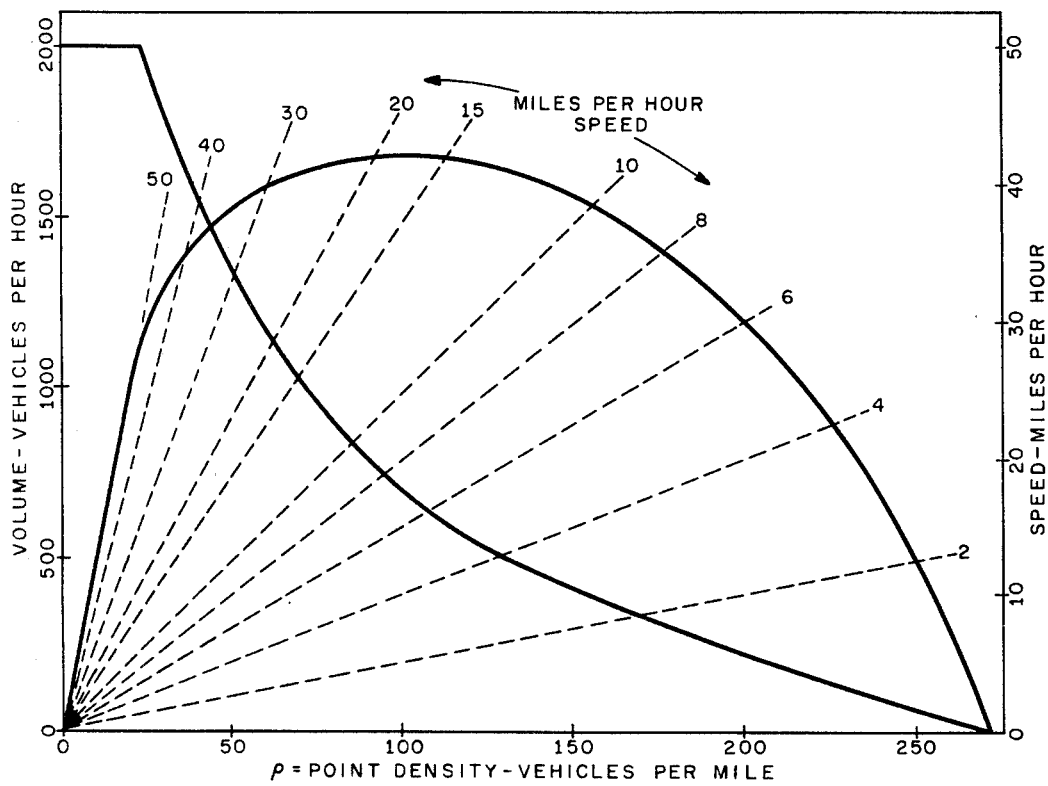
FIG. 6 is a graph of point density versus vehicle speed and vehicle count.

To provide a signal $\bar{s}_n$ representative of the vehicle speed averaged over the number of vehicles $n$, the signal $s$ from the divide circuit 61 is connected to an accumulate and average circuit 64 which is also responsive to the signal $n$. A divider circuit 65 is responsive to the $\bar{s}_n$ signal for dividing the $n$ signal to provide a signal $\rho_n$ representative of the point density. The point density $\rho_n$ is thus the number or volume of vehicles per unit time divided by the speed in miles per the same unit time. The importance of point density $\rho_n$ is shown in FIG. 6 which is a typical plot of point density $\rho_n$ versus speed and vehicle count or volume. The volume or the number of vehicles which can be passed is a maximum for a given value of point density $\rho$. This also occurs at a given speed. The utility of having the point density as a controlled parameter can be appreciated from FIG. 6.

Another output of the apparatus of FIG. 4 is time headway $\bar{t}_{(HW)_n}$ averaged over $n$ vehicles. The time headway can be explained by referring to FIG. 7 where the pulses R, L, O, N and M are shown as they would be generated by three vehicles passing under the sensor.

Figure 7:
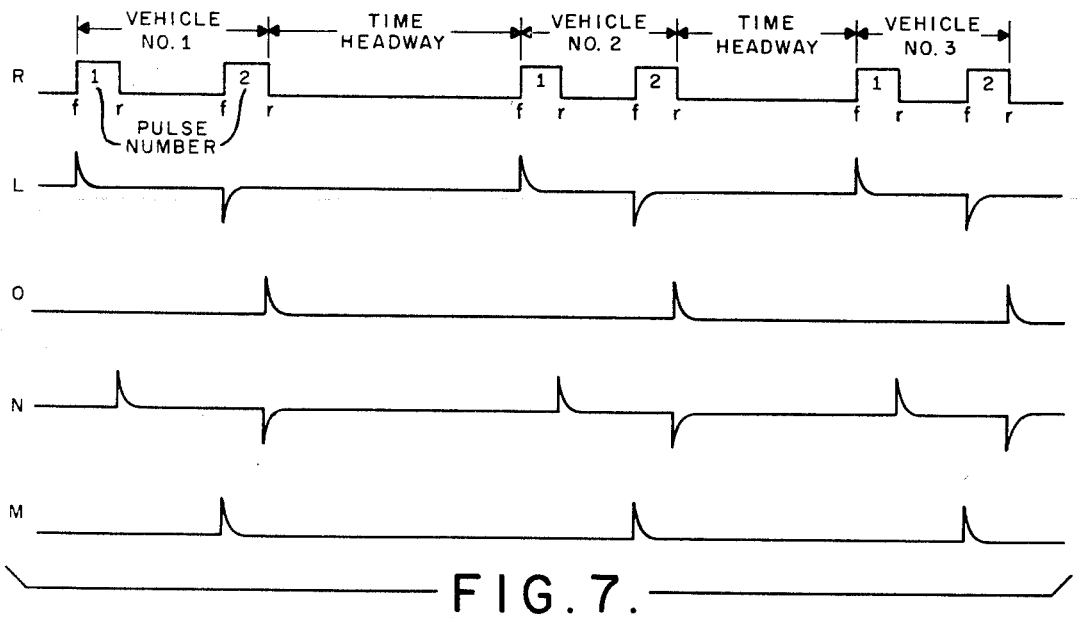
FIG. 7 is a graphical series of waveforms as they would be generated by three vehicles in succession showing headway.

The time headway $t_{(HW)_2}$ for vehicle number 2 is obtained by use of the following equation:

$$\text{Time Headway for Vehicle 2} = (t_{f_{12}}^{\text{Pulse No.}} - t_{r_{21}}^{\text{Car No.}}) = t_{(HW)_2} \quad (4)$$

where the first numerical subscript represents the pulse number as shown in FIG. 7 and the second numerical subscript represents the vehicle number. Similarly, the time headway $t_{(HW)_3}$ for vehicle 3 is obtained by use of the following equation:

$$\text{Time Headway for Vehicle 3} = (t_{f_{13}} - t_{r_{22}}) = t_{(HW)_3} \quad (5)$$

This process can be continued for $n$ vehicles as it is shown in FIG 4 where a gated counter 66 is responsive to pulses N, O and L for reset, start and stop functions respectively to provide an output signal representative of $$(t_{f_{1i}} - t_{r_{2(i-1)}})$$

which is connected to a multiplier 67 and an accumulate and average circuit 68. The circuit 68 is also responsive to the signal $n$ to provide an output signal $\bar{t}_{(HW)_n}$ representative of the time heading averaged over $n$ vehicles, usually in seconds.

The distance headway $l_{(HW)}$ is obtained from the time headway $t_{(HW)}$ and speed $s$ information in accordance with the following equation to compute distance headway for vehicle number 2:

Distance Headway Vehicle
$$\text{No. } 2 = (t_{f_{12}} - t_{r_{21}})s_1 = l_{(HW)_2} \quad (6)$$

while the distance headway for vehicle number 3 is:

Distance Headway Vehicle
$$\text{No. } 3 = (t_{f_{13}} - t_{r_{22}})s_2 = l_{(HW)_3} \quad (7)$$

using the same subscript designation explained above. As was the case for time headway, distance headway $\bar{l}_{(HW)_n}$ averaged over $n$ vehicles, usually in feet, can be obtained by multiplying in multiplier 67 the signal $(t_{f_{1i}} - t_{r_{2(i-1)}})$ by a signal $s_{(i-1)}$ obtained via a speed storage circuit 69 coupled to divider 61. The signal $s_{(i-1)}$ is the speed of the vehicle $i$ less one. The signal $l_{(HW)_i}$ from the multiple 67 is accumulated and averaged in circuit 70 which is also responsive to the signal $n$ to provide the signal $\bar{l}_{(HW)_n}$.

For reset purposes, the circuits 62, 64, 65, 68 and 70 are responsive to the system reset signal S. The averaging performed by the circuits 62, 64, 68 and 70 could take many forms. The average could be simply a running sum divided by the number of vehicles $n$ or it could employ more sophisticated means which would provide the probability distribution.

The system described with respect to FIGS. 2 and 4 may be modified to inhibit any signal that may result from the signals A or B, particularly signal B, due to the fact that the vehicle may be intercepting both beams with the antenna R$_2$ switched in thereby providing false signals resulting from spurious reflection. This may be accomplished as indicated by the solid lines by utilizing inhibit logic circuit 42 which provides an inhibit signal T to input terminals of the AND gates 20 and 32, respectively. The information required to generate the inhibit signal T may be obtained from information received from the front end of the vehicle passing through the beams 1 and 2, i.e., $t_{f_1}$ and $t_{f_2}$. As explained above, the time interval $(t_{f_1} - t_{f_2})$ is indicative of speed in accordance with the aforementioned relationship. The inhibit signal T is a pulse having a time duration determined as follows. Pulse duration of inhibit signal T equals the car length divided by the car speed where the car length is determined empirically and the speed is as computed above. In a system such as that disclosed in said U.S. patent application S.N. 452,974 where computing means is available at some central point, the inhibit signal T could be generated at that point. The inhibit signal 20 in the above explanation is intended to inhibit when it is not present and the system functions as described previously, i.e., normally when the inhibit signal T is present.

Although the present invention has been described with respect to a radar transmitter, and receiver, it will be appreciated that the present invention is equally applicable to a loop sensor.

The antennas explained may have a number of vehicles passing under their influence in sequence with associated output signals appearing in sequence. When this occurs and under certain speeds and car spacing conditions, it is possible that the pulse $(t_{r_1}-t_{r_2})$ from one car may become considered with the pulse $(t_{f_1}-t_{f_2})$ from the next car. This could lead to some confusion in the system which may be eliminated as follows:

The output signal R of FIGS. 2 and 3 can be modified such that a pair of pulses, which are generated for each vehicle, will be unique. The object is to make the pulse pair such that a decoding means can be provided to recognize a valid pair of pulses. The implementation is such that if the pulses are valid, a given procedure is executed in the computation of the outputs. If the pulses are not valid, then a different procedure for handling the pulses is executed. For example, if only one pulse is received then the "divide by two" in the computation of vehicle length shown in FIG. 4 would be modified to "divide by one."

Figure 8:
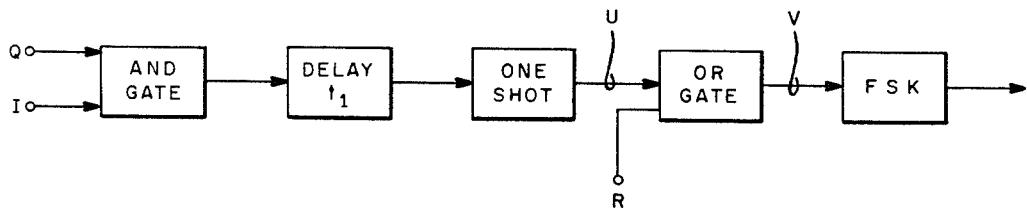
FIG. 8 is a portion of a schematic block diagram of apparatus used in conjunction with the system of FIG. 2 to avoid possible ambiguity.

The logic necessary to provide this new pulse train is shown in FIG. 8. The pulse train $v$ is the pulse train R followed by a validation pulse U which has been delayed by a small amount of time $t_1$. The validation pulse U requires the coincidence of pulses I and Q. The pulse Q is the leading edge of pulse J. The two pulses I and J are the basic information of the system and, therefore, the presence of a validation pulse provides assurance that the information is valid and not the result of any spurious pulses.

Figure 9:
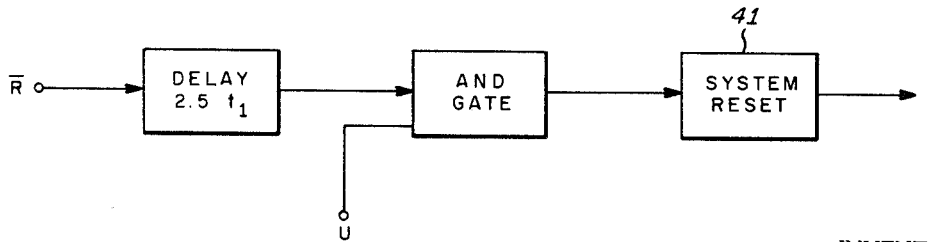
FIG. 9 is a portion of a schematic block diagram of apparatus used in conjunction with the system of FIG. 2 to render the system directionally sensitive.

This validation pulse can be used in implementing a means for rejecting the signal U from the system when a vehicle enters the area of influence of the beams 1 and 2 in the reverse direction. A means of making the antenna combination directionally sensitive and jam-proof is shown in FIG. 9. The duration of the delay in FIG. 9 is shown at $2.5t$. This delay is a function of speed and should be as follows:

$$\text{Delay} = \frac{d}{\text{Max. Speed}} + \frac{t_1}{2}$$

The delay does not need to be variable but the fixed value should be as indicated. For example, if speed=100 ft./sec. antenna spacing=1 foot and $t_1$=66 milliseconds, the delay becomes 43 milliseconds.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. Apparatus for determining certain characteristics of a moving object pertinent to controlling its movement comprising,
 (a) means or directing energy onto a path for defining the beginning and end of a known distance,
 (b) receiving means responsive to said energy for providing discrete signals when the front and rear of said object traverse said beginning and end of said known distance along said path,
 (c) signal shaping means responsive to said discrete signals for providing time interval signals representative of the time intervals required for said front and rear of said object to traverse said known distance, and
 (d) computing means responsive to said time interval signals for providing measures representative of said certain characteristics including object speed and length as a function of said known distance and said time interval signals.

2. Apparatus of the character recited in claim 1 in which said means for directing energy onto a path comprises directive transmitter means for radiating energy onto said path and said receiving means comprises first and second receiving means in spaced relation with respect to said transmitter means along said path for receiving reflected energy from said object.

3. Apparatus of the character recited in claim 2 and further including detector means selectively coupled to said first and second receiving means for producing additional discrete signals in response to the reflected energy received from said object.

4. Apparatus of the character recited in claim 1 in which said object is a vehicle and said computing means further includes means for providing measures representative of volume and density of the traffic flow.

5. Apparatus of the character recited in claim 1 in which said computing means further includes means for providing measures representative of the time and distance between the vehicle ahead and the vehicle being measured.

6. Apparatus of the character recited in claim 1 in which said signal shaping means provides discrete signals representative of $t_{f_1}$, $t_{f_2}$, $t_{r_1}$ and $t_{r_2}$ where $t_{f_1}$ is the time when the front of said object intercepts the beginning of said known distance, $t_{f_2}$ is the time when the front of said object intercepts the end of said known distance, $t_{r_1}$ is the time when the rear of said object intercepts the beginning of said known distance, and $t_{r_2}$ is the time when the rear of said object intercepts the end of said known distance, and said computing means includes means responsive to said discrete signals for providing measures representative of individual object speed, object length, distance and time between the object being measured and the object ahead, and number of objects.

7. Apparatus of the character recited in claim 6 in which said computing means further includes accumulating and averaging means responsive to said measures representative of object speed, object length, distance and time between the object being measured and the object ahead, and number of objects for providing additional measures representative of averaged values of said measures and point density.

References Cited

UNITED STATES PATENTS 3,109,157   10/1963   Bolton _____ 340—39

RODNEY D. BENNETT, *Primary Examiner.*

C. L. WHITHAM, *Assistant Examiner.*